Dec. 6, 1966  C. W. PURBAUGH  3,289,969
FLEXIBLE TAPE RULE

Filed March 1, 1965  2 Sheets-Sheet 1

INVENTOR.
Claude W. Purbaugh
BY
B. B. Olive
ATTORNEY

Dec. 6, 1966  C. W. PURBAUGH  3,289,969
FLEXIBLE TAPE RULE

Filed March 1, 1965  2 Sheets-Sheet 2

INVENTOR.
Claude W. Purbaugh
BY
*B. B. Olive*
ATTORNEY

United States Patent Office 3,289,969
Patented Dec. 6, 1966

3,289,969
FLEXIBLE TAPE RULE
Claude W. Purbaugh, Monrovia, Calif., assignor to H. K. Porter Company, Inc., Monrovia, Calif., a corporation of Delaware
Filed Mar. 1, 1965, Ser. No. 435,879
4 Claims. (Cl. 242—107.3)

This invention relates to flexible tape rules of the type in which the tape is coiled within a casing and is withdrawn under tension of a retracting spring. More specifically, the present invention is an improvement on the invention described in Letters Patent 3,114,515 and is concerned with means for applying a releasable braking force against the tension of the retracting spring so that the tape can be retained in any given extended position.

Heretofore, in flexible measuring tapes of the same general type as the tape of the invention, various arrangements have been used for braking and holding the tape at various extended positions. In one arrangement, the tension spring is coiled inside of a drum on the outside of which the tape is wound and braking is effected by braking the drum which, in effect, brakes the tape. Patent 700,698 establishes this method and has been carried down in various forms in more recent patents. Another more recent patent applies the braking force directly to the face of the tape rule as is shown in Patent 2,814,881. The first type has the disadvantage of requiring a drum and the second type has the disadvantage of causing wear to the face of the tape upon which the indicia is printed. An improvement over both of these prior art arrangements is found in the tape shown in the previously mentioned prior Patent 3,114,515 in that the tape is connected directly to the spring and the braking force is applied to an edge of the tape rather than to a tape surface or an intermediate drum.

Experience gained in using and manufacturing the type of tape rule covered by Patent 3,114,515 (hereafter sometimes referred to as the tape edge brake type rule) has led to the present invention. In particular, various tradesmen have indicated a desire for a tape edge brake type rule which would require even less finger release pressure than that required by the structure shown in Patent 3,114,515. There has also become evident a need for a more complete braking release than that allowed by commercially produced rules following the structure shown in Patent 3,114,515. From a manufacturing viewpoint it has also been found desirable to provide some means for adjusting the brake pressure to some near standard value after the rule has been assembled. In this regard the leaf spring employed in the structure of Patent 3,114,515 has been found difficult to adjust and critical to manufacture. Other manufacturing problems have arisen in connection with drilling the button stem and assembling the friction pin in the tape rule of Patent 3,114,515.

With the foregoing in mind, an object of this invention is to provide a flexible tape rule of the tape edge brake type which requires less pressure to release than in previous rules of the same type.

Another object is to provide a flexible tape rule of the tape edge brake type which allows the brake to be completely released under pressure thereby permitting unlimited freedom of the inner spring to retract the blade.

Another object is to provide a braking arrangement for flexible tape rules of the tape edge brake type which permits use of a more rigid tape.

An object of this invention is to provide braking elements for flexible tape rules of the tape edge brake type in which the brake pressure can be regulated after the elements have been assembled.

An object is to provide a flexible tape rule of the tape edge brake type which is less expensive and simpler to manufacture than previous rules of the same type.

These together with other objects and advantages which will become subsequently apparent reside in the details of construction and operation as more fully hereinafter described and claimed, reference being had to the accompanying drawings forming a part hereof, wherein like numerals refer to like parts, and in which:

Figure 1:
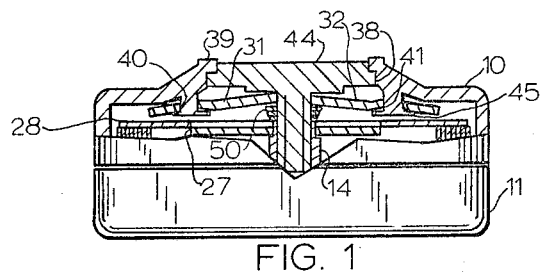
FIGURE 1 is a fragmentary elevation section view taken through the rule showing the tape released from braking action.

Prior to describing the invention in detail, it may be seen that in the embodiment shown in the drawings, there is a case having top and bottom sections with a post structure made integral with the bottom section. One end of the retracting spring which applies tension to the tape is attached to the post. The retracting spring and tape are fastened together and both are coiled around the post with the tape being coiled around the spring. One edge of the tape frictionally engages the bottom case section and the other edge frictionally engages a braking plate or disc member loosely mounted on the post structure. A coil spring resides on the post structure and extends above the braking disc member. The braking disc member is pressed directly against the edge of the tape by means of a pair of pivoted, loosely mounted levers which engage and receive the force of the coil spring so as to assert a braking force which exceeds the normal retracting tension spring force. The levers are pivotedly mounted in the top section of the case and are arranged so that under the influence of the coil spring the end portions of the levers automatically engage the braking disc and press the braking disc against the edge of the tape when the two sections of the case are assembled. The push button can be depressed from outside the case and once the button is depressed, the levers pivot and the end portions thereof move away from the braking disc thereby releasing the disc from tension applied by the levers and coil spring. Once the push button is depressed, the braking action is completely released. Further, the present invention allows the amount of braking force and amount of movement required to assert the braking force to be regulated by adjusting the shape of the levers.

With reference to the drawings, the device includes a case comprising top section 10 and bottom section 11. Top section 10 and bottom section 11 are held together by suitable screws, not shown, which reside in and extend through holes indicated at 12 in top cover 10 into threaded holes 13 in bottom cover 11. Access to the interior of the case is gained by removal of the mentioned screws.

A slotted round post 14 is fixed inside the case and is made integral with the interior wall 15 of the bottom cover 11 on which it is centrally positioned. The upper end of post 14 is turned down so as to provide a shoulder 16. In further reference to post 14, it will also be noted that the mentioned slot indicated at 18 extends beyond the cavity 17 and terminates at 19 slightly above the bottom cover wall 15. Also made integral with the bottom cover 11 is a somewhat annular shaped boss 20 that rises from wall 15.

A lower disc 21 is provided for supporting the flexible coil retracting spring 22 which has one end 22' fixed in slot 18. As indicated in the drawings, disc 21 is mounted by means of a hole in its center on the base of post 14 and lays against boss 20. In addition to its other functions, disc 21 acts to segregate retracting spring 22 and tape 23 and also assists in aligning the coils of the measuring tape 23. Retracting spring 22 is preferably of less width than the measuring tape shown at 23 to which it may be joined by any suitable connecting means such as generally indicated at 24. It is to be especially noted that the retracting spring 22 and the tape 23 are joined directly without use of the conventional drum between the retracting spring 22 and tape 23.

The end of tape 23 extends through the case tape slot and is provided at the slot 25 with the usual handle 26 which serves both as a handle and as a means of preventing entry of the zero end of the tape through slot 25 and into the case once assembled. After lower disc 21, tape 23, and retracting spring 22 have been assembled in the bottom of cover 11 in the manner described and as shown in the drawings, a smaller disc 27 having a hole at its center corresponding to the diameter of the turned down portion of post 14 is placed so as to rest upon shoulder 16. Coil spring 50 also surrounds post 14 and rests on disc 27 against which it asserts a continuous force.

A top braking plate or disc 28 having a hole at its center corresponding to the diameter of the smaller disc 27 is placed so as to lay against the exposed edges of tape 23. In manufacture of the component parts, disc 27 and disc 28 are die cut in a single operation. Top disc 28 has an integral tape guide 29 which serves to guide the flexible tape 23 through slot 25. From this description it will be seen that any pressure that is applied to disc 28 will tend to be impressed against the edges of the tape adjacent disc 28 and will thus tend to restrain the tape 23 between disc 28 and wall 15. At this point, the description turns to a description of the means for maintaining such a pressure against disc 28 and for releasing such pressure.

The structural members previously referred to may be thought of as the bottom cover sub-assembly and in fact such parts are preferably assembled and removed for repairs as a sub-assembly. Complementary to this bottom cover sub-assembly is the top cover sub-assembly which includes the top cover 10, a push button 30, and levers 31 and 32. Push button 30 includes a circular head portion 33, a stub portion 34, and a stem portion 35 with a pair of guide members 36, 37 which pass through slot 18 and allow the stem portion 35 to extend into post 14 when top cover sub-assembly is positioned for working relation with the bottom cover sub-assembly. The push button 30 also has a finger tab 44 of smaller diameter than the circular head portion 33 and by which pressure is applied to the push button 30.

With reference to top cover 10, it will be noted that the central outside portion of cover 10 is formed as a bulge as indicated by the thickened cross section 38. A protruding ledge 39 is made integral with the extreme outer edge of the thickened bulge 38. Bulge portion 38 provides a circular well that is formed by wall 38 and which is adapted to receive the circular head portion 33 of push button 30 in a free slidable relation. Ledge 39 prevents the push button 30 from being withdrawn from the top cover 10 but does allow finger tab 44 to remain flush with ledge 39. A pair of pin members 40, 41 are made integral with top cover 10. In assembly, after the push button 30 is in place, the levers 31, 32 are placed so to allow pins 40, 41 to extend through holes 42, 43 in the levers. Once levers 31, 32 are in place, the ends of the pins 40, 41 are staked as at 45 so as to flatten these ends and provide means for retaining levers 31, 32 on pins 40, 41.

Figures 7, 8, 9, 10, 12:
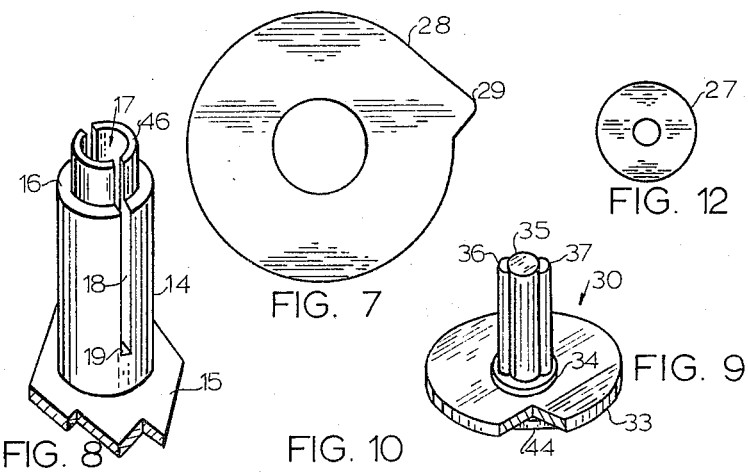
FIGURE 7 is a plan view of the braking disc.
FIGURE 8 is a fragmentary perspective view of a post employed in the invention.
FIGURE 9 is a perspective view of a push button employed in the invention, the push button being shown inverted.
FIGURE 10 is an elevation view of the levers which are used to brake the tape.
FIGURE 12 is a plan view of a disc employed in the invention.
Figure 11:
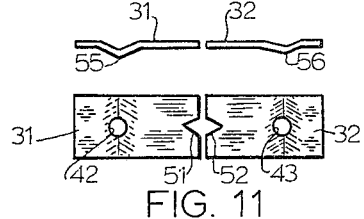
FIGURE 11 is a plan view of the levers.

Stem portion 35 and guide members 36, 37 fit loosely within the provided V-slots 51, 52 of the levers 31, 32. As best shown in FIGURE 10, levers 31, 32 are formed essentially flat but with arcs 55, 56 formed adjacent the outer ends. In mounting the levers 31, 32 and prior to the previously mentioned staking operation, arcs 55, 56 are placed so that both are curved towards the exterior of the case. Looked at from the interior of cover 10, the top cover sub-assembly appears as in FIGURE 3. It may be noted in this regard that this sub-assembly may be made subject to a product control step in the sense of regulating the levers 31, 32 to some braking standard. That is, levers 31, 32 are preferably made of a relatively inflexible, rigid metal material which can be stamped out to the shapes illustrated by FIGURES 10 and 11. In operation, levers 31, 32 normally retain such shapes. However, even after levers 31, 32 are installed on pins 40, 41 as described, levers 31, 32 can be bent slightly as required to adjust their braking effect whereas with the leaf spring of the prior Patent 3,114,515, such in-place adjustment has proven difficult to accomplish.

Figure 2:
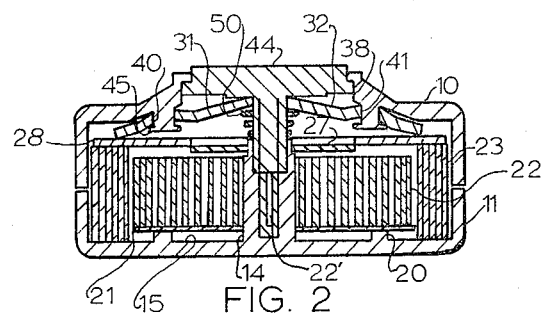
FIGURE 2 is an elevation section view taken through the center of the rule showing the tape under braking action.
Figure 3:
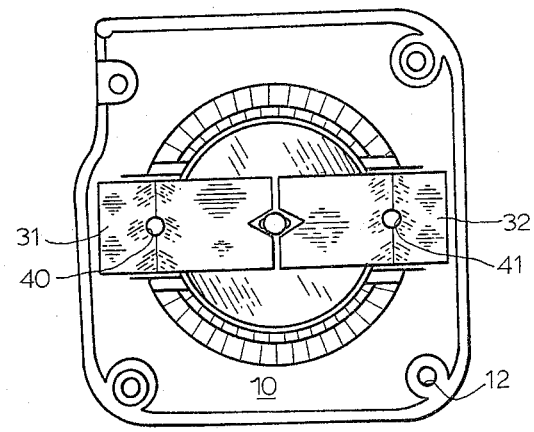
FIGURE 3 is a plan view showing the bottom side of the top cover of the rule.
Figure 4:
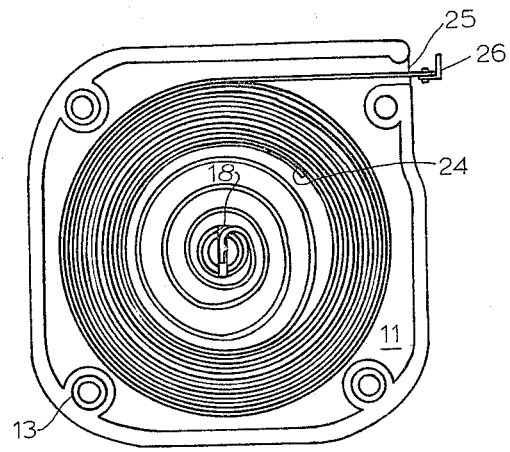
FIGURE 4 is a plan view taken with the top cover and the braking disc of the rule removed.
Figure 5:
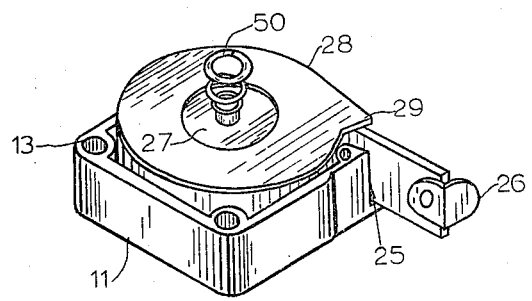
FIGURE 5 is a perspective view taken without the top cover and showing the braking disc and coil spring in position.
Figure 6:
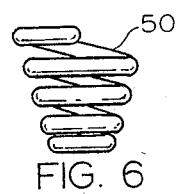
FIGURE 6 is an elevation view of the coil spring employed in the invention.

In assembling the top cover assembly of FIGURE 3, with the bottom cover assembly of FIGURE 5, stem portion 35 and guide members 36, 37 are guided into cavity 17 and slot 18, after which top cover 10 is assembled in matching relation with bottom cover 11. With the covers 10, 11 fastened together, levers 31, 32 will assume the radial positions shown and will automatically be placed in tension due to spring 50 and will cause disc 28 to be pressed tightly against the edges of tape 23 so as to effect the desired braking action. At the same time the circular head portion 33 of push button 30 is brought into contact with ledge 39 as best shown in FIGURE 2 which shows the rule elements as they appear when braking action is applied.

To use the tape rule, button 30 is depressed by applying pressure to finger tab 44 which causes the stem portion 35 to go further into cavity 17 of post 14. At the same time, the stub portion 34 of button 30 will bear firmly against the ends of levers 31, 32 adjacent V-slots 51, 52 and will in turn tend to cause these ends of levers 31, 32 to press against spring 50. This action results in levers 31, 32 pivoting around the respective arcs 55, 56 and the lifting of the free ends of the levers which have been pressing on disc 28 so as to completely release the braking force as best shown in FIGURE 1. Tape 23 may now be freely extended to any desired position and when in the desired position may be held there by releasing pressure on finger tab 44 whereby to allow tabs 31, 32 to resume their braking position as best shown in FIGURE 2.

In summary, the braking arrangement of the present invention particularly as compared to that described in Patent 3,114,515 can be seen to have many advantages. Substantially less thumb pressure is required to pivot the pivoted radial levers against the coil spring of the present invention than was required to flex and pivot the leaf spring of the prior patent. Employment of a more rigid blade is allowed by the present invention since when the brake is released there is more assurance of a complete release of the braking action than has proven to be the case with the rule of the prior patent. Of particular importance to production control is the ability to change the shape of the levers after they have been staked in position so as to achieve a relatively standard braking action. In manufacture, the present invention also has many advantages in having eliminated the critical leaf spring and the friction pin drilling operation required by the rule of the prior patent. The coil spring employed in the present invention is less critical than the prior employed leaf spring and the punch press staking operation applied to the levers simplifies final assembly. Also, as previously mentioned the coil spring support plate and brake plate of the present invention can be made with one die in one punch press operation which reduces the number of manufacturing steps required to make the rule.

Having described the invention, what is claimed is:

1. In a flexible tape rule the combination of a case including a tape slot; post means fixedly mounted within said case and extending from one side thereof; a tape retracting spring coiled in said case around said post means and having one end fixed thereto; a measuring tape coiled around said retracting spring and having one end connected directly to said retracting spring and the other end extending through said slot, said tape having one edge in frictional engagement with the said one side of said case to which said post means is fixed and the other edge laterally spaced from the other side of said case; a thin disc loosely mounted in said case and engaging said other edge; lever means pivotedly mounted within said case adjacent said other side; a coil spring centrally mounted within said case and having one end bearing on said post means and another end bearing on said lever means whereby to cause said lever means to engage said disc and brake said tape; and push button means movably mounted in said case opposite said disc and having a portion engaging said lever means, inwardly movement of said push button means being effective to pivot said lever means out of engagement with said disc whereby to release said tape.

2. In a flexible tape rule the combination of a case including a tape slot; post means fixedly mounted within said case and extending from one side thereof; a tape retracting spring coiled in said case around said post means and having one end fixed thereto; a measuring tape coiled around said retracting spring and having one end connected directly to said retracting spring and the other end extending through said slot, said tape having one edge in frictional engagement with the said one side of said case to which said post means is fixed and the other edge laterally spaced from the other side of said case; a thin disc loosely mounted in said case and engaging said other edge; a pair of levers pivotedly mounted within said case adjacent said other side and extending radially from the center thereof; a coil spring centrally mounted within said case and having one end bearing on said post means and another end bearing on the ends of said levers whereby to cause said levers to engage said disc and brake said tape; and push button means movably mounted in said case opposite said disc and having a portion engaging the ends of said levers opposite said coil spring, inwardly movement of said push button means being effective to pivot said levers out of engagement with said disc whereby to release said tape.

3. In a flexible tape rule as claimed in claim 2 wherein said post means comprises a hollow post and said push button means includes a stem portion surrounded by said coil spring and being slidably mounted in said post.

4. In a flexible tape rule as claimed in claim 3 wherein each of said levers comprises a flat inflexible rectangular metal strip having a curved portion formed intermediate its length, said curved portion being adapted to provide a point of pivot for said strip.

References Cited by the Examiner

UNITED STATES PATENTS

| 2,080,815 | 5/1937 | Gasstrom. |
| 2,172,043 | 9/1939 | Wolf _____ 242—107.6 |
| 3,114,515 | 12/1963 | Kane _____ 242—107.3 |

FRANK J. COHEN, *Primary Examiner.*

W. S. BURDEN, *Assistant Examiner.*